United States Patent [19]

Isono et al.

[11] Patent Number: 5,317,810
[45] Date of Patent: Jun. 7, 1994

[54] CLINOMETER

[75] Inventors: Masaru Isono; Fumio Ohtomo; Susumu Saito, all of Tokyo, Japan

[73] Assignee: Kabushiki Kaisha Topcon, Tokyo, Japan

[21] Appl. No.: 841,161

[22] Filed: Feb. 25, 1992

[30] Foreign Application Priority Data

Feb. 26, 1991 [JP] Japan .................................. 3-031088

[51] Int. Cl.$^5$ ............................................ G01C 9/24
[52] U.S. Cl. .......................................... 33/366; 33/379
[58] Field of Search ................. 33/366, 379, 365, 377, 33/DIG. 3; 250/231.1

[56] References Cited

U.S. PATENT DOCUMENTS

| | | | |
|---|---|---|---|
| 4,861,981 | 8/1989 | Winiger | 33/366 X |
| 5,101,570 | 4/1992 | Shimura | 33/366 |

OTHER PUBLICATIONS

English translation of Japanese Patent Document No. 2-42310, Feb. 13, 1990 by Shimura.

Primary Examiner—William Cuchlinski, Jr.
Assistant Examiner—Christopher W. Fulton
Attorney, Agent, or Firm—Finnegan, Henerson, Farabow, Garrett & Dunner

[57] ABSTRACT

A clinometer provided with a level vial filled with a transparent liquid and a bubble, and a projector for irradiating the level vial. The clinometer includes center calculating means for calculating the center of a bubble from light receiving signals of first and second line sensors and inclination calculating means for calculating an inclination of the level vial from the center calculated by the center calculating means, wherein the first and second line sensors which receive light passing through the level vial are crossed at right angles and located so that the crossed point exists on the central axis of the level vial.

5 Claims, 10 Drawing Sheets

F I G. 6(A)
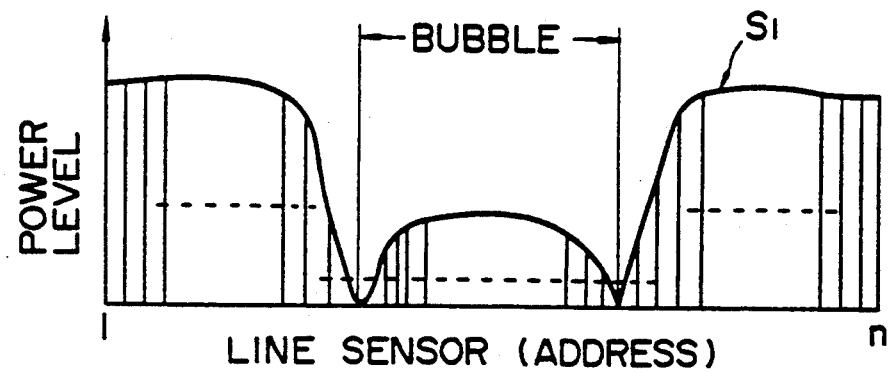
F I G. 6(B)
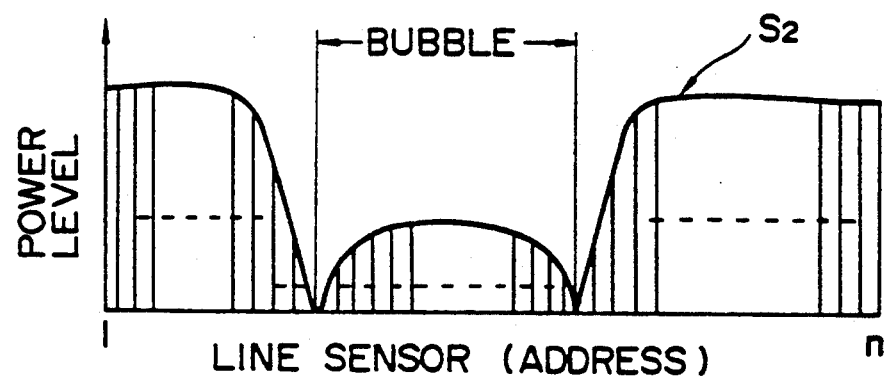
F I G. 6(C)
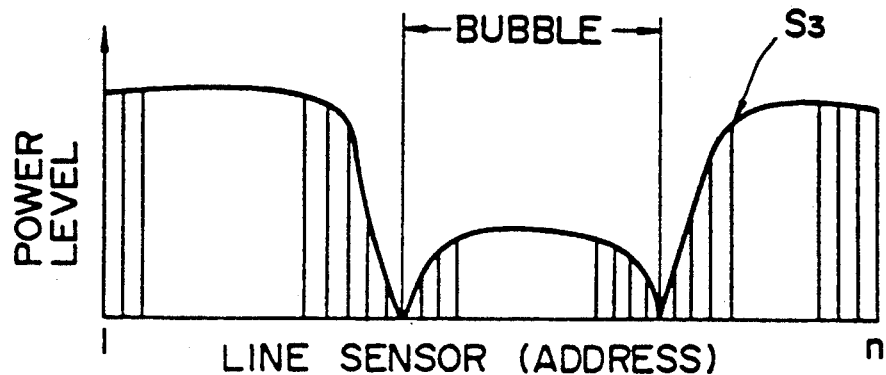

F I G. 7(A)
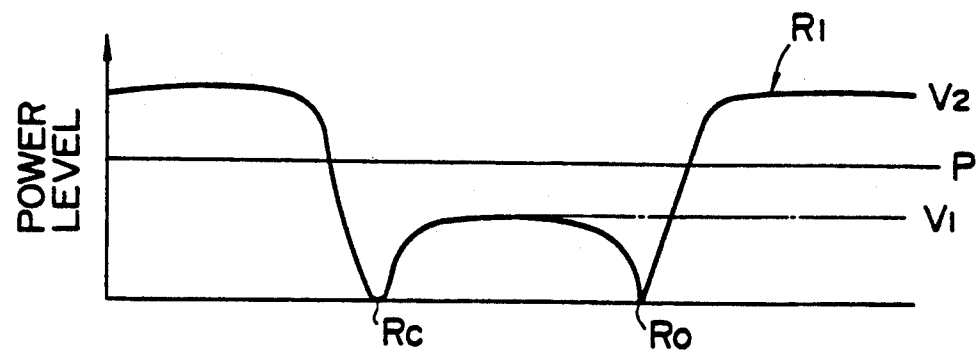
F I G. 7(B)
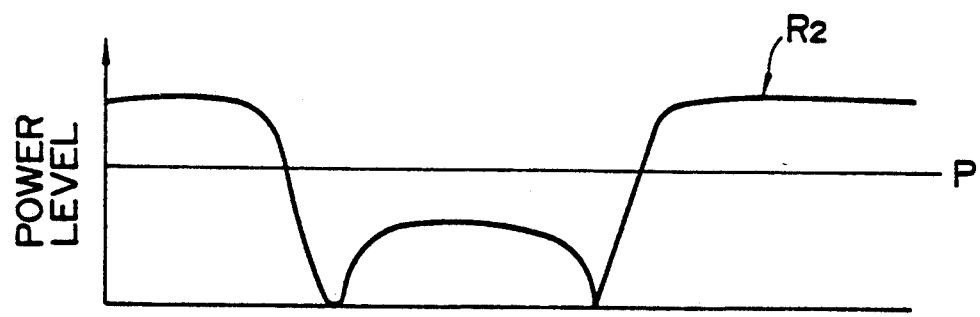
F I G. 7(C)
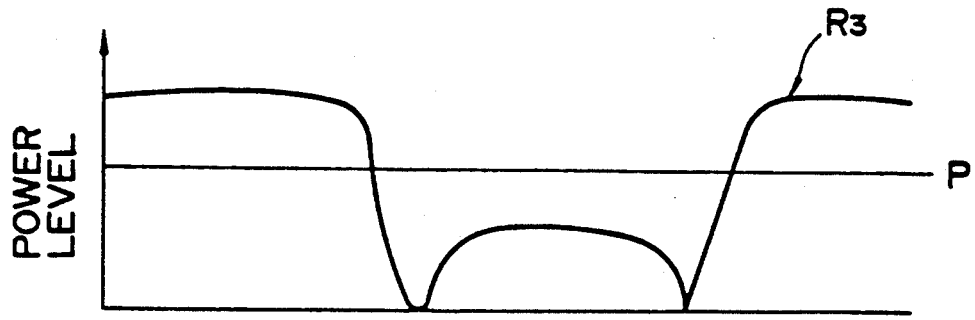

F I G. 14
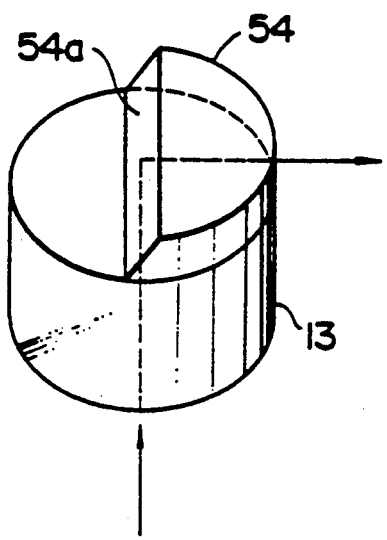
F I G. 15
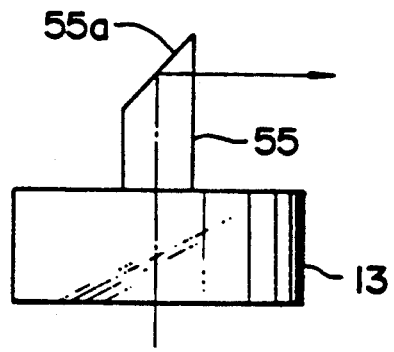

CLINOMETER

BACKGROUND OF THE INVENTION

This invention relates to a clinometer provided with a level vial filled with transparent liquids and a bubble, and a projector for irradiating the level vial.

Heretofore, there has been known a clinometer as shown in FIG. 16 and described in Japanese Patent Application Early Laid-open Publication H2-42310.

Referring to FIG. 16, a level vial 1 includes a transparent vessel 3 of which an upper inside wall is formed spherically hollow, and a transparent liquid 4 and a bubble 5 inside the vessel 3. Under the level vial 1 are disposed a light source 6 such as a light emitting diode, and a lens 7 for converting the light emitted from the source 6 into parallel rays of light. Over the level vial 1 is disposed a light receiving element 8 for receiving a bubble shadow 5a (see FIG. 17). Numeral 9 designates an arithmetic unit for calculating an inclination of the vessel 3 from an amount of light received by the element 8.

The element 8 consists of light receiving portions 8a to 8d, each area of which is equalized, each of which extends along the X-axis or Y-axis as shown in FIG. 17. When the vessel 3 has no inclination, the bubble 5 is located at the center of the vessel 3 and hence the center of the bubble shadow 5a as drawn by a stitch line coincides with the origin of the axes. Each amount of light of the portions 8a to 8d is equal to each other at that time.

When the bubble shadow 5a moves from the center to a position as a solid line in proportion to an inclination of the vessel 3, its movement varies each area of the potions 8a to 8d shaded by the bubble shadow 5a. The variation of the area signifies that of an amount of light received by each light receiving portion 8a to 8d. Therefore, an inclination of the vessel 3 can be calculated from each amount of light of the portions 8a to 8d. In other words, the angle of an inclination corresponds to the variation or rate of change of an amount of the received light. The arithmetic unit 9 can calculate the angle of an inclination of the vessel 3 on the basis of the variation.

Conventional clinometers calculate an inclination in terms of an amount of light received by the light receiving element as mentioned above. However, a diameter of the bubble 5 in the vessel 3 fluctuates according to air temperature, so that an amount of light received by the portions 8a to 8d varies. Accordingly, they had to compensate according to air temperature in order to gain the accurate angle of an inclination of the vessel 3. Further, they have several problems such as nonuniformity of light emitted from the source 6 or irregular sensitivity of the light receiving element 8.

SUMMARY OF THE INVENTION

An object of the present invention is to provide a clinometer able to determine an accurate angle of inclination of a level vial regardless of outside air temperature, variation and nonuniformity of an amount of illuminating light, and irregular sensitivity of a light receiving element.

A clinometer according to the invention includes center calculating means for calculating the center of a bubble from light receiving signals of first and second line sensors and inclination calculating means for calculating an inclination of the level vial from the center calculated by the center calculating means, wherein the first and second line sensors which receive light passing through the level vial are crossed at right angles and the line sensors are located so that the crossed point exists on the central axis of the level vial.

BRIEF DESCRIPTION OF THE DRAWINGS

FIGS. 6A-6C is graphical representations showing time series signals outputted from the line sensors.

FIGS. 7A-7C is graphical representations showing time series wave signals.

FIG. 14 is a perspective view of a clinometer according to still another embodiment of the invention wherein a mirror is formed in a semi-circular, transparent member.

FIG. 15 is a side view of a mirror of a clinometer according to still another embodiment of the invention.

DETAILED DESCRIPTION OF THE PREFERRED EMBODIMENTS

Embodiments of the present invention will be hereinafter described with reference to the accompanying drawings.

Figure 1:
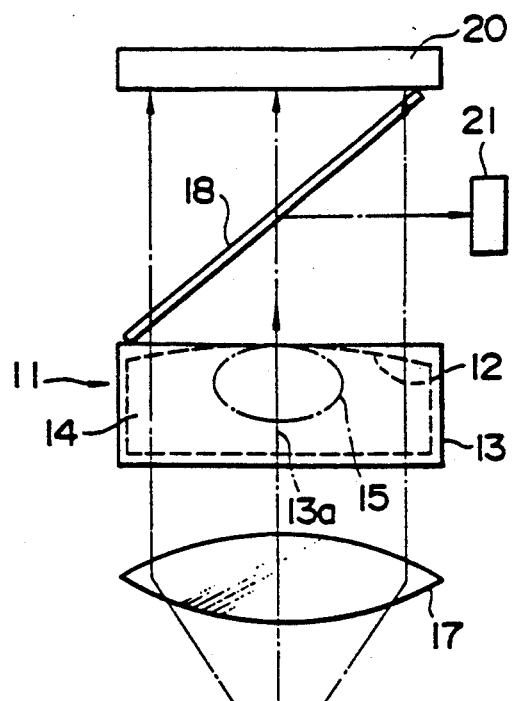
FIG. 1 is a side view showing an arrangement of an optical system of a clinometer according to the invention.
Figure 2:
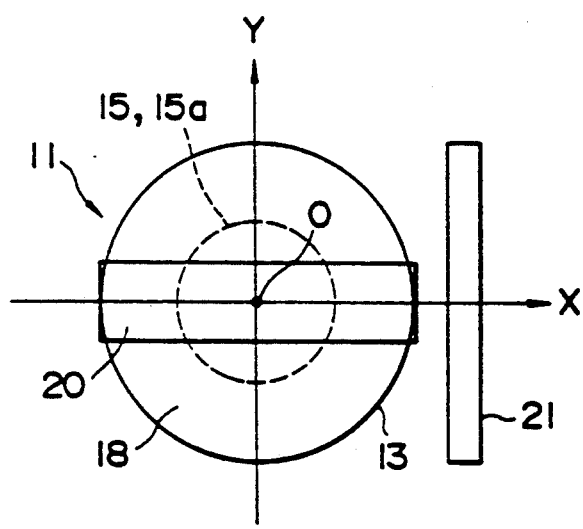
FIG. 2 is a top view of the clinometer of FIG. 1.

In FIGS. 1 and 2, a level vial 11 includes a transparent vessel 13, of which an upper inside wall 12 is formed spherically hollow, filled with a transparent liquid 14 and a bubble 15. The bubble 15 moves along wall 12 in proportion to an inclination of the vessel 13.

Under the level vial 11 are disposed a light source 16 or a projector 16 for emitting irradiation light and a lens for changing the light into parallel rays of light to irradiate the vial 11.

Over the level vial 11 are disposed a half mirror 18, a first line sensor 20 for receiving a bubble shadow through the mirror 18, and a second line sensor 21 for receiving the bubble shadow reflected from the mirror 18, and so forth. The first and second line sensors 20 and 21 both consist of a charge storage type of array of light receiving elements such as a CCD (Charge Coupled Device). A width of each light receiving element or a length of the shorter sides of the line is formed smaller than a diameter of the bubble 15. The first and second line sensors 20 and 21 may consist of an array of photodiodes or any photolectric transfer elements instesd of the CCD.

Figure 3:
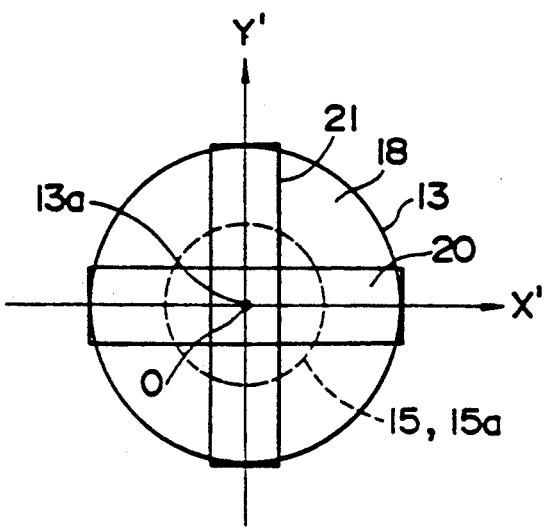
FIG. 3 illustrates an optical relation between line sensors.

Referring to FIG. 3, the first and second line sensors 20 and 21 cross each other at right angles optically with respect to the level vial 11 and the first and second line sensors are located on the X-axis and the Y-axis respectively. The intersection point of the two line sensors or the origin O exists on the center line 13a of the level vial 11 or transparent vessel 13.

When the vessel 13 has no inclination, the center of the bubble 15 coincides with the center line 13a of the vessel 13 and hence the center of the bubble shadow 15a, as drawn by a stitch line in FIG. 3, coincides with the origin O.

Figure 4:
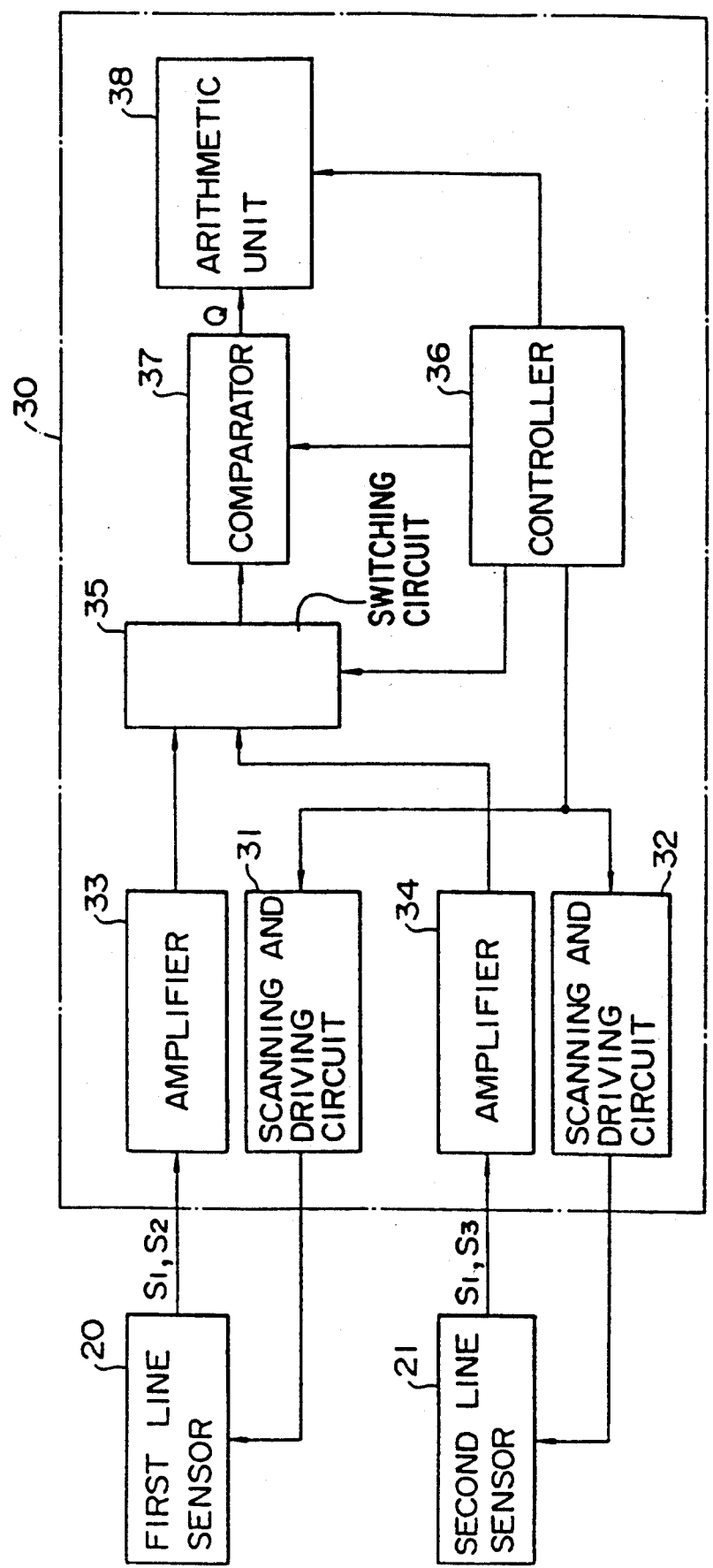
FIG. 4 is a block diagram of a signal processor of a clinometer of the present invention.

FIG. 4 shows signal processing unit 30 for calculating an inclination of the vial 11 based on light receiving signals outputted from the first and second line sensors 20 and 21. Numerals 31 and 32 show scanning and driving circuits for scanning and driving the first and second line sensors 20 and 21. The circuits 31 and 32 scan and drive the line sensors so as to successively output signal charges from every unit cell which are proportionate to an amount of light stored by each unit cell of the sensors 20 and 21. These signal charges are then converted into time series signals S1 to S3 as shown in FIG. 6.

Figure 8:
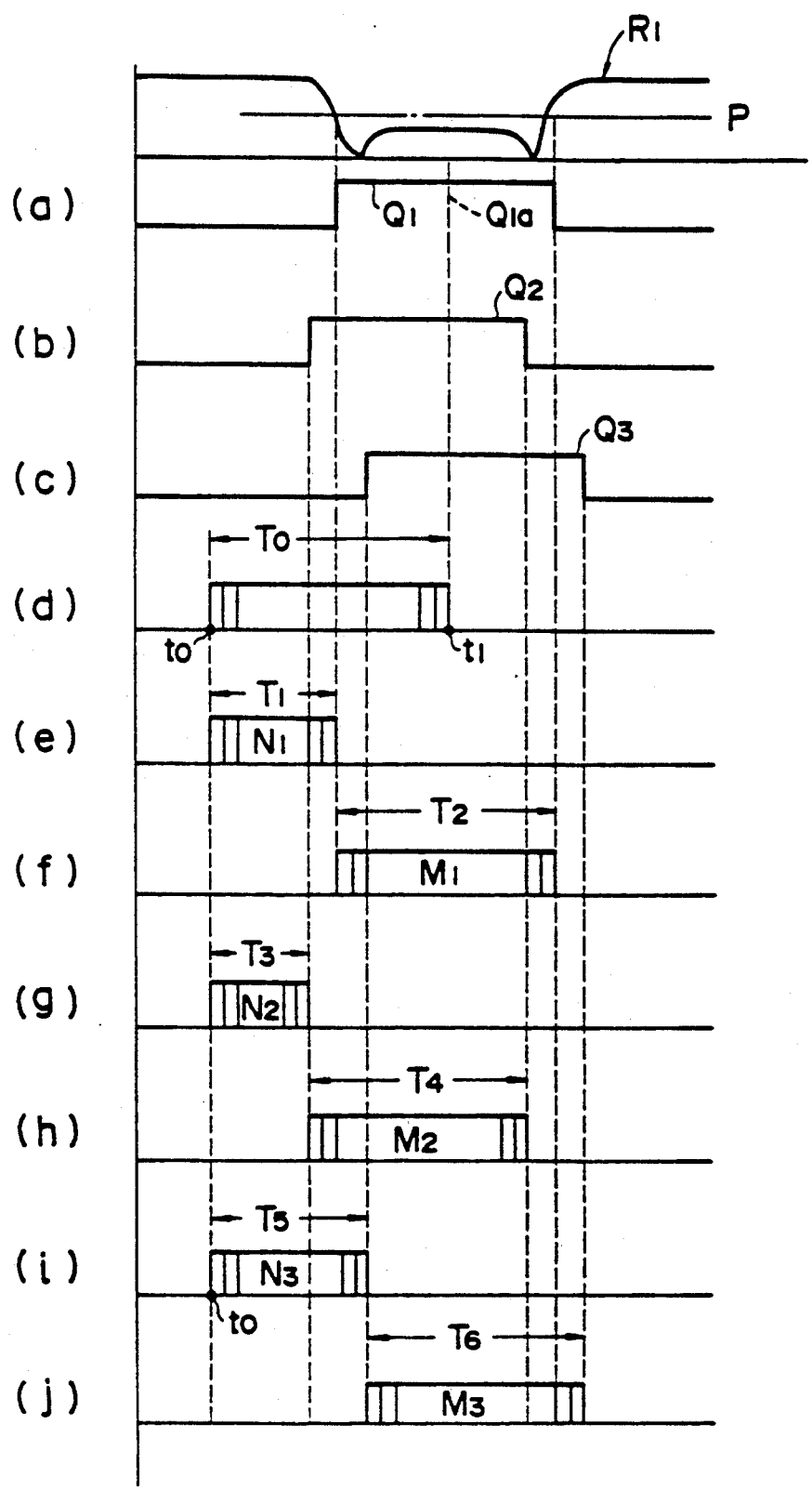
FIG. 8 is time charts showing a relation between comparison signals and the sum total of counts of clock pulses.

Numerals 33 and 34 designate amplifiers for amplifying the time series signals S1 to S3 outputted from the line sensors 20 and 21, numeral 35 designates a switching circuit for selecting to pass the time series signals S1 to S3 of either of the first and second line sensors 20 and 21 on command by a controller 36 as described hereunder, and numeral 37 designates a comparator which filters the time series signals S1 to S3 through the switching circuit 35 and converts these signals S1 to S3 into time series wave signals R1 to R3 respectively as shown in FIG. 7 and outputs high-level comparison signals Q when voltages of the time series wave signals R1 to R3 are less than a predetermined reference voltage P (see FIG. 8). The reference voltage P is predetermined more than a voltage V1 of the time series wave signals corresponding to the bubble and less than a voltage V2 of the time series wave signals corresponding to portions except the bubble.

The controller 36 with microcomputers controls the scanning and driving circuits 31 and 32, the switching circuit 35, the comparator 37, and the arithmetic unit 38, so as to operate in a given timing. At the same time, the controller 36 outputs clock pulses for outputtig time series signals after scanning the first and second line sensors 20 and 21.

Figure 5:
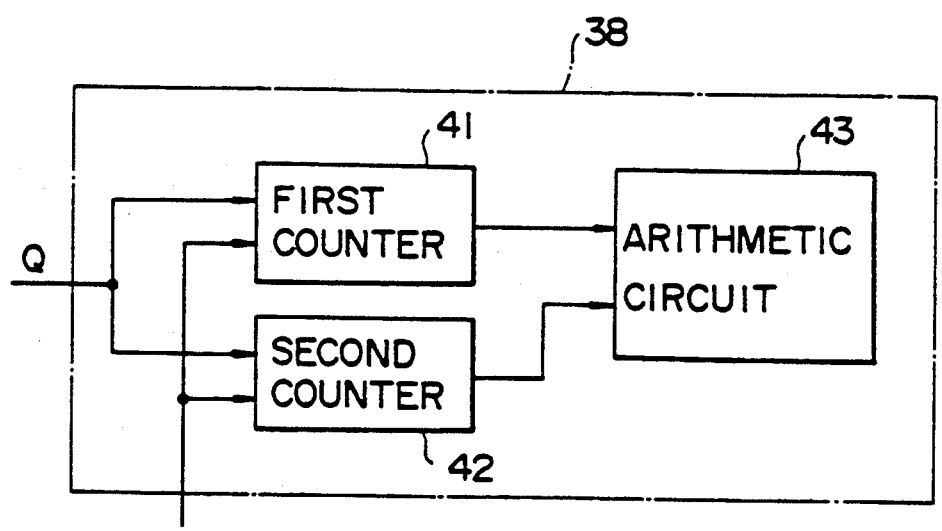
FIG. 5 is a block diagram of an arithmetic circuit of the signal processor of FIG. 4.

The arithmetic unit 38 calculates the angle of an inclination of the vessel 13 by counting the clock pulses relative to the comparison signals Q outputted from the comparator 37. The arithmetic unit 38, as shown in FIG. 5, includes first and second counters 41 and 42, and an arithmetic circuit 43. The first counter counts the clock pulses outputted from the controller 36 during a period covered from the start time of the scan of the first and second line sensors 20 and 21 to the output of the comparison signals Q, and the second counter counts the same while the comparison signals Q keep outputted. The arithmetic circuit 43 first calculates the center of the bubble 15 on the basis of the sum total of counts counted by the first and second counters, then calculates to find the angle of an inclination from the obtained center.

The combination of the comparator 37, the first and second counters 41 and 42, and the arithmetic circuit 43 acts as central position calculating means, and the arithmetic circuit 43 solely acts as inclination calculating means.

Detailed operations of the clinometer arranged as mentioned above will be now described with reference to FIGS. 6 to 8.

First, the case where the angle of an inclination is zero will be described. The center of the bubble 15 coincides with the origin O of the axes X' and Y' as shown in FIG. 3 and a time series signal S1 in FIG. 6(A) is output from each of the first and second line sensors 20 and 21 scanned and driven by the scanning and driving circuits 31 and 32. Thereafter, the switching circuit 35 commanded by the controller 36 inputs the signal S1 of the first line sensor 20 in the comparator 37. This signal S1 is then converted into a time series wave signal R1 as shown in FIG. 7(A) by the comparator 37 and the wave signal R1 is compared with the reference voltage P. If the wave signal R1 is less than the reference voltage P, a high-level comparison signal Q1 is output from the comparator 37 as shown in FIG. 8(a).

The first counter 41 of the arithmetic unit 38 counts clock pulses output from the controller 36 during a period from the start time t0 (see FIG. 8) of the scan of the line sensors 20 and 21 to the output of the comparison signal Q1 from the comparator 37, i.e. during a period T1 as shown in FIG. 8(e). The sum total of counts for the period T1 is defined as N1. On the other hand, the second counter 42 counts the clock pulses during a period T2 when the comparator 37 keeps outputting the comparison signal Q1 (see FIG. 8(f)). The sum total of counts for the period T2 is defined as M1. The arithmetic circuit 43 calculates an x coordinate of the center of the bubble 15 from N1 and M1 and the x coordinate is then converted into the angle of an inclination $\theta 1$ with respect to the X-axis as in the following equations. Since the bubble 15 moves on the upper inside wall of the transparent vessel according to an inclination thereof, the equation (2) is arrived at as follows:

$$X \text{ coordinate} = \text{Reference value } N0 - (N1 + M1/2) \quad (1)$$

$$\theta 1 = K \cdot X \text{ coordinate} \quad (2)$$

where K is a conversion factor for angles of inclanation, and reference value N0, which is premeasured, is the sum total of counts of clock pulses counted during a period T0 (see FIG. 8(d)) from the start time t0 of the scan of the first and second line sensors 20 and 21 to the time t1 corresponding to the center Q1a of the comparison signal Q1 or the center of the bubble 15.

According to the equations (1) and (2), the x coordinate gains zero by the calculating of the arithmeic circuit 43 from N1 and M1, and the angle $\theta 1$ of an inclination with respect to the X-axis equals zero.

Thereafter, the switching circuit 35 is switched so as to input the time series signal S1a of the second line sensor 21 to the comparator 37. Since the center of the bubble 15 is located at the origin O, S1 equals S1a, in other words, the time series signal S1a is same as S1 in FIG. 6(A). The first and second counters 41 and 42 counts clock pulses to gain N1 and M1. The arithmetic circuit 43 calculates y coordinate of the center of the bubble 15 from the counts N1 and M1 and gains the angle $\theta 2$ of an inclination with respect to the Y-axis. As a result, the angle $\theta 2$ equals zero.

Figure 9:
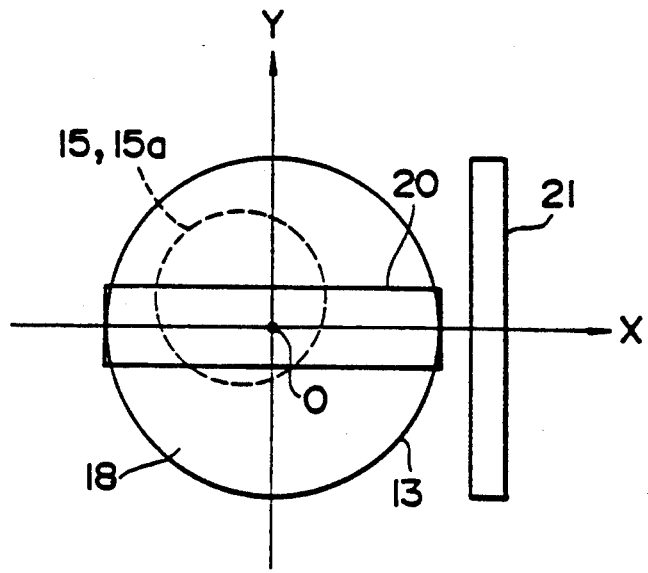
FIG. 9 is a top view showing a movable bubble and the line sensors.

There will be now described a situation where the transparent vessel 13 is inclined and the bubble 15 is moved to the location as shown in FIG. 9.

Time series signals S2 and S3 as shown in FIGS. 6(B) and 6(C) are output from the line sensors 20 and 21 respectively. And the switching circuit 35 inputs the time series signals S2 from the first line sensor 20 in the comparator 37 on command by the controller 36. The signal S2 is converted into a time series wave signal R2 to compare it with the reference voltage P as shown in FIG. 7(B). If the wave signal R2 is less than the reference voltage P, the comparator 37 outputs a high-level comparison signal Q2 (see FIG. 8(b)).

Meanwhile, the first counter 41 of the arithmetic unit 38 counts clock pulses output from the controller 36 during a period from the start time t0 (see FIG. 8) of the scan of the first line sensor 20 to the output of the comparison signal Q2 output from the comparator 37. As shown in FIG. 8 (g), the first counter 41 counts clock pulses for a period T3. The sum total of counts for the period T3 is defined as N2. On the other hand, the second counter 42 counts the same during a period T4 when the comparator 37 keep outputting the comparison signal Q2. The sum total of counts for the period T4 is defined as M2. According to the equation (1), the arithmetic circuit 43 calculates the x coordinate of the center of the bubble 15 from N2 and M2. According to the equation (2), the angle $\theta 1$ of an inclination with respect to the X-axis is calculated. As a result, $\theta 1 = K\{N0 - (N2 + M2/2)\}$.

Thereafter, the switch circuit 35 is switched to input a time series signal S3 (see FIG. 6(c)) of the second line sensor 21 in the comparator 37. The comparator 37 converts the signal S3 into a time series wave signal R3 as shown in FIG. 7(c) to compare it with the reference voltage P. If the wave signal R3 is less than the reference voltage P, the comparator outputs a high-level comparison signal Q3 as shown in FIG. 8(c).

Meanwhile, the first counter 41 of the arithmetic unit 38 counts clock pulses output from the controller 36 during a period T5 from the start time t0 of the scan of the second line sensor 21 to the outputting of the comparison signal Q3 outputted from the comparator, as shown in FIG. 8(i). The sum total of counts for the period T5 is defined as N3. On the other hand, the second counter 42 counts the same during a period T6 (see FIG. 8(j)) when the comparator 37 keeps outputting the comparison signal Q3. The sum total of counts for the period T6 is defined as M3. According to the equation (1), the arithmetic circuit 43 calculates the y coordinate of the center of the bubble 15 from N3 and M3 to gain the angle $\theta 2$ of an inclination with respect to the Y-axis. As a result, $\theta 2 = K\{N0 - (N3 + M3/2)\}$.

Generally, a diameter of the bubble 15 or a width of the comparison signal Q1 as shown in FIG. 8(a) varies according to outside air temperature. However, the center of the bubble 15 maintains the same position as usual. Therefore, the center Q1a of the comparison signal Q1 and the reference value N0 are always constant regardless of air temperature. Further, the reference value N0 is influenced by neither surface irregularity of line sensors 20 and 21 nor nonuniformity of light emitted from the source 16. The same rule applies as well to the cases of comparison signals Q2 and Q3. Since the sum total of counts such as N1 or M1 relates to the width of each comparison signal, it is also subject to neither the aforementioned irregularity nor the nonuniformity. The angles $\theta 1$ and $\theta 2$ according to the equations (1) and (2) can be accurately determined without the requirement of determining any compensation caused by air temperature and without any influence caused by the irregularity or the nonuniformity.

Figure 10:
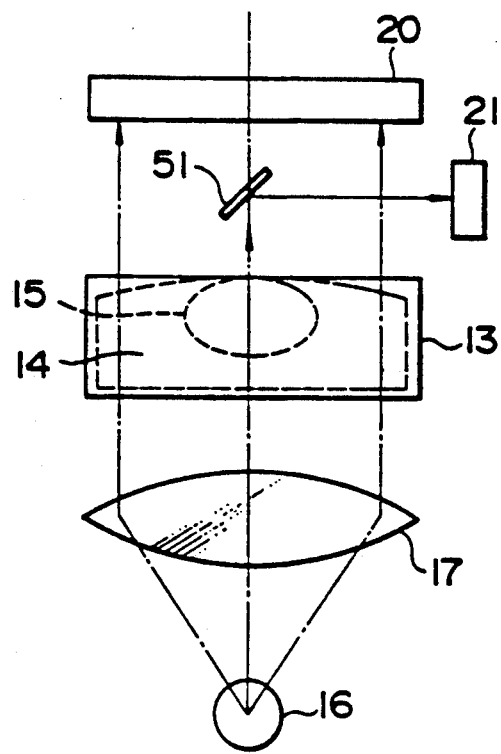
FIG. 10 is a side view of an arrangement of an optical system of a clinometer according to another embodiment of the invention.
Figure 11:
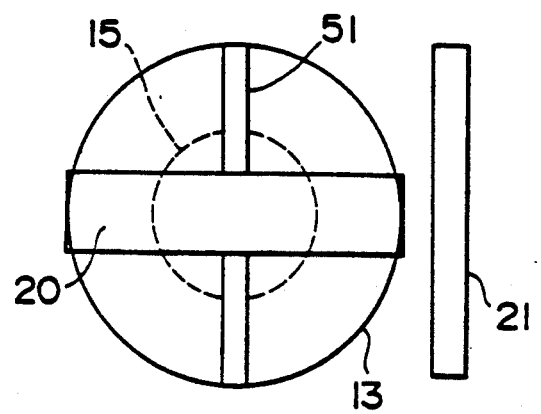
FIG. 11 is a top view of the clinometer of FIG. 10.

FIGS. 10 and 11 show other embodiments. According to these embodiments, the clinometer includes a total reflection mirror 51, of which a width is arranged less than a diameter of the bubble 15 and of which a length is larger than that diameter of the bubble 15, instead of the half mirror 18.

Figure 12:
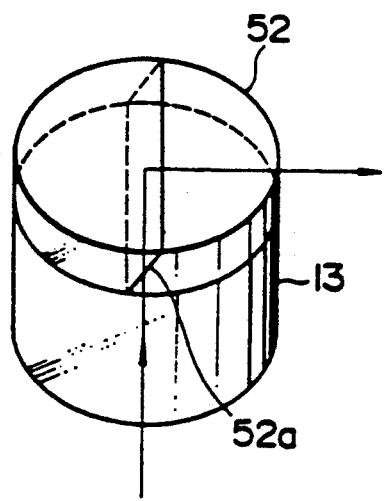
FIG. 12 is a perspective view of a clinometer according to still another embodiment of the invention wherein a mirror is formed in a circular, transparent member.
Figure 13:
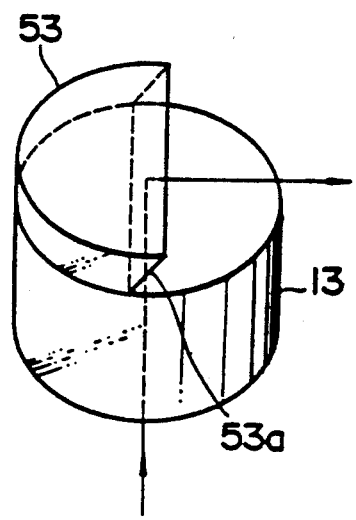
FIG. 13 is a perspective view of a clinometer according to still another embodiment of the invention wherein a mirror is formed in a semi-circular, transparent member.
Figure 16:
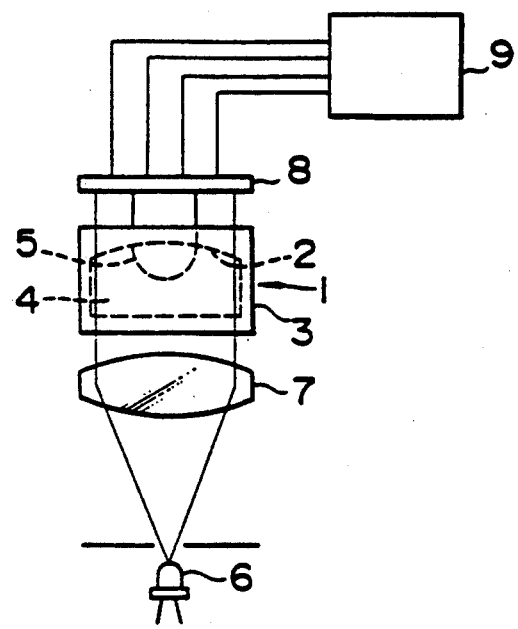
FIG. 16 shows an arrangement of an optical system of a conventional clinometer.
Figure 17:
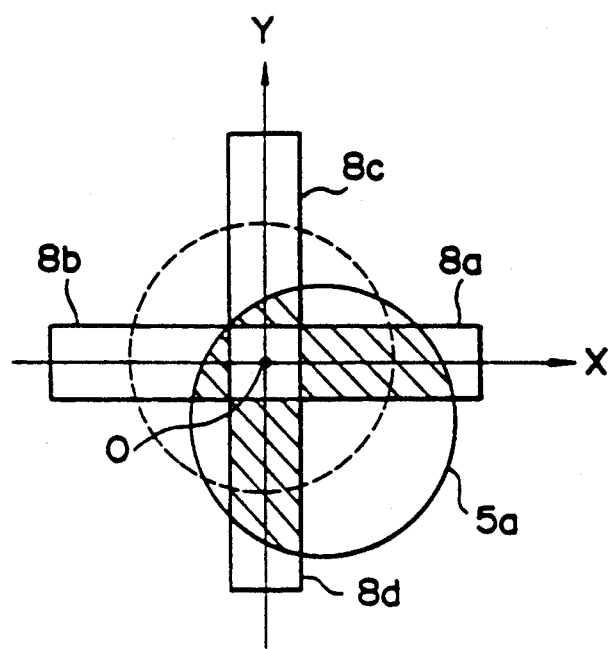
FIG. 17 shows an optical, positional relation between light receiving elements and a bubble shadow.

A plate type of mirror or other various types of mirrors as shown in FIGS. 12 to 15 may be used as a total reflection mirror. A mirror in FIG. 12 is disposed on an inclined surface 52a of a circular transparent member 52, mirrors in FIGS. 13 and 14 are disposed on an inclined surface 53a and 54a of semi-circular transparent members 53 and 54, and a mirror in FIG. 15 is disposed on an inclined surface 55a of a long cylindrical transparent member 55.

The comparison signal Q may be output for an interval equal to the diameter of the bubble 15, i.e. for an interval between the minimum levels R0 and R0 of the time series wave signal R, instead of outputting the comparison signal Q for the period when the time series wave signal R is less than the reference voltage P as in the embodiments mentioned above.

The angle of an inclination may be calculated as follows:

A lamp wave voltage is generated during scanning the line sensors 20 and 21, the lamp wave voltage is measured at the rise and down of the comparison signal Q, according to the measured voltage are calculated two periods one of which is covered from the generating time of the lamp wave voltage to the rise of the comparison signal Q and another of which is covered between the rise and down of the comparison signal Q, and the angle of an inclination is calculated from the periods.

Further, the first and second line sensors 20 and 21 may be arranged to cross each other directly not optically via the mirror.

What is claimed is:

1. A clinometer comprising:
   a level vial including a transparent vessel having a concave upper inside wall, said transparent vessel containing a transparent liquid and a bubble, said bubble moving in proportion to an angle of an inclination of said transparent vessel;
   means for projecting light toward said transparent vessel;
   first and second line sensors for receiving light, said first and second line sensors optically crossing each other at an intersection point substantially coinciding with a central axis of said level transparent vessel;
   means for dividing light passing through said transparent vessel into first and second portions of light and for directing said first and second portions of light to said first and second line sensors, respectively;

means for calculating a central position of said bubble based on time series signals output from each of said first and second line sensors; and means for calculating angles of inclination based on said central position calculated by said central position calculating means.

2. A clinometer comprising:

a level vial including a transparent vessel having a concave upper inside wall, said transparent vessel containing a transparent liquid and a bubble, said bubble moving in proportion to an angle of an inclination of said transparent vessel;

means for projecting light toward said transparent vessel;

first and second line sensors for receiving light, said first and second line sensors optically crossing each other at an intersection point substantially coinciding with a central axis of said transparent vessel;

means for directing first and second portions of light emanating from said transparent vessel to said first and second line sensors, respectively, including a light reflecting surface perpendicular to a longitudinal direction of said first line sensor to reflect the first portion of light passing through said transparent vessel to said second line sensor, the second portion of light emanating from said transparent vessel being directed to said first line sensor, means for calculating a central position of said bubble based on time series signals output from each of said first and second line sensors; and means for calculating angles of inclination based on said central position calculated by said central position calculating means.

3. A clinometer according to claim 1 or 2, wherein said central position calculating means compares the time series signals of said first and second line sensors with a predetermined reference level to obtain two positions of said time series signals corresponding to said reference level, and said central calculating means calculates the middle between said two positions same as the central positions of said bubble.

4. A clinometer according to claim 3, wherein said central position calculating means calculates said two positions corresponding to said reference level and the middle point thereof based on the sum total of counts read by said line sensors.

5. A clinometer according to claim 1 or 2, wherein said central position calculating means includes a comparator for comparing time series signals of said first and second line sensors with a predetermined reference level and a counter for counting the sum total of scan pulses which said first and second line sensors have read during a period covered from the detecting time of coincidence between a level of time series signals and said reference level detected by said comparator to the next detecting time, and a central position of said bubble is calculated based on the sum total of scan pulses counted by said counter.

* * * * *

UNITED STATES PATENT AND TRADEMARK OFFICE
CERTIFICATE OF CORRECTION

PATENT NO. : 5,317,810
DATED : June 07, 1994
INVENTOR(S) : Masaru Isono et al.

It is certified that error appears in the above-indentified patent and that said Letters Patent is hereby corrected as shown below:

Claim 3, Column 8, Line 12 after "central" insert --position--.

Claim 3, Column 8, Line 14 "positions" should read --position--.

Signed and Sealed this

Third Day of January, 1995

Attest:

BRUCE LEHMAN

Attesting Officer    Commissioner of Patents and Trademarks